US011349135B2

United States Patent
Lin et al.

(10) Patent No.: US 11,349,135 B2
(45) Date of Patent: May 31, 2022

(54) METHOD OF PREPARATION AND APPLICATION FOR GLASS CERAMIC SEALING THIN STRIPS

(71) Applicants: Tai-Nan Lin, Taoyuan (TW); Szu-Han Wu, Taoyuan (TW); Yi-Jing Wu, Taoyuan (TW); Min-Fang Han, Taoyuan (TW); Wei-Xin Kao, Taoyuan (TW); Hong-Yi Kuo, Taoyuan (TW); Chun-Yen Yeh, Taoyuan (TW); Yung-Neng Cheng, Taoyuan (TW); Ruey-Yi Lee, Taoyuan (TW)

(72) Inventors: Tai-Nan Lin, Taoyuan (TW); Szu-Han Wu, Taoyuan (TW); Yi-Jing Wu, Taoyuan (TW); Min-Fang Han, Taoyuan (TW); Wei-Xin Kao, Taoyuan (TW); Hong-Yi Kuo, Taoyuan (TW); Chun-Yen Yeh, Taoyuan (TW); Yung-Neng Cheng, Taoyuan (TW); Ruey-Yi Lee, Taoyuan (TW)

(73) Assignee: INSTITUTE OF NUCLEAR ENERGY RESEARCH, ATOMIC ENERGY COUNCIL, EXECUTIVE YUAN, Taoyuan (TW)

( * ) Notice: Subject to any disclaimer, the term of this patent is extended or adjusted under 35 U.S.C. 154(b) by 0 days.

(21) Appl. No.: 16/984,097

(22) Filed: Aug. 3, 2020

(65) Prior Publication Data
US 2022/0037682 A1 Feb. 3, 2022

(51) Int. Cl.
*H01M 8/0286* (2016.01)
*H01M 8/0276* (2016.01)
(Continued)

(52) U.S. Cl.
CPC ....... *H01M 8/0286* (2013.01); *H01M 8/0276* (2013.01); *H01M 8/0282* (2013.01); *H01M 8/2432* (2016.02); *H01M 2008/1293* (2013.01)

(58) Field of Classification Search
CPC ............ H01M 8/0286; H01M 8/2432; H01M 8/0276; H01M 8/0282
See application file for complete search history.

(56) References Cited

U.S. PATENT DOCUMENTS

2005/0123810 A1* 6/2005 Balan .................. H01M 8/0612
429/411

FOREIGN PATENT DOCUMENTS

JP 2009-87829 * 4/2009 ............. H01M 8/02

* cited by examiner

*Primary Examiner* — Helen Oi K Conley

(57) ABSTRACT

A method of preparation and application for a glass ceramic sealing thin strip with high sealing performance, differing from using conventional glass ceramic packaging paste applied to the junction of the cell stack assembly and connecting plates. The glass ceramic sealing thin strip of present invention utilizes tape casting to produce a single layer or multi-layer stacking in accordance with the required thickness of the glass-ceramic sealing thin strip, and cutting the glass ceramic sealing thin strips from molds in accordance with the geometry of cell stacks with equal thickness of the glass ceramic sealing thin strip for SOFC cell stack assembly, aiming to overcome the setbacks of the conventional dispensing method with glass ceramic packaging paste that makes the thickness difficult to control, and to effectively improve sealing performance of the cell stack assembly and the power generation efficiency, and achieve commercial application with mass production.

8 Claims, 3 Drawing Sheets

(51) Int. Cl.
*H01M 8/0282* (2016.01)
*H01M 8/2432* (2016.01)
*H01M 8/12* (2016.01)

METHOD OF PREPARATION AND APPLICATION FOR GLASS CERAMIC SEALING THIN STRIPS

BACKGROUND OF THE INVENTION

1. Field of the Invention

The present invention relates to the manufacturing and sealing procedures of glass ceramic sealing thin strips, and more particularly to a glass ceramic thin strip produced by tape casting with a specific formula.

2. Description of Related Art

In the conventional technology for packaging SOFC cell stacks, generally the glass ceramic powders with good sealing effect are used to prepare sealing glass glue by mixing different types of grinding powder and mixing in proportion to obtain the sealing glass glue. In the conventional packaging operation, glass glue is applied to the joints between the components of the cell stack and the cell plate, and the sealing effect takes place through high temperature compression. This method is not suitable for continuous and large-scale cell stack packaging operations, and the thickness of its sealing glue is also prone to uneven thickness and size due to differences of coating time during sequential works in packaging operation, causing defects and leakage during the process of high temperature sealing.

In view of the above-mentioned shortcomings of the conventional way by dispensing glass ceramic paste for packaging SOFC cell stacks, the present invention aims to mitigate these setbacks through utilizing tape casting to produce a single layer or multi-layer stacking in accordance with the required thickness of the glass ceramic sealing thin strip, and cutting the glass ceramic sealing thin strips from molds in accordance with the geometry of cell stacks with equal thickness of the glass ceramic sealing thin strip for SOFC cell stack assembly.

SUMMARY OF THE INVENTION

Contrary to the conventional way by dispensing glass ceramic paste for sealing SOFC cell stacks, the present invention uses glass ceramic sealing thin strips with equal thickness for sealing SOFC cell stacks through cutting the glass ceramic sealing thin strips from molds in accordance with the geometry of SOFC cell stacks and is suitable for mass production.

The main object of the present invention is to provide a sealing process using glass ceramic thin strips to improve adhesive sealing characteristics of adjacent components and improve electrical performance in a cell stack of membrane electrode assembly (MEA) of solid oxide fuel cell (SOFC) or unit cell.

Another object of the present invention is to provide a controllable size of the glass ceramic sealing thin strip of equal thickness for sealing unit cells. With controllable sealing thin strip size and thickness, the process disclosed by the present invention is suitable for mass production and can effectively improve the output power density of the unit cells in the test and provide long-term stable power output.

Another object of the present invention is to disclose a manufacturing process of the glass ceramic sealing thin strip of the present invention that can be carried out on a small scale or mass production, and the thin strips are stacked with various layers to meet the packaging conditions required by the target thickness of different unit cells.

Other objects, advantages and novel features of the invention will become more apparent from the following detailed description when taken in conjunction with the accompanying drawings.

DETAILED DESCRIPTION OF THE PREFERRED EMBODIMENTS

Figure 1:
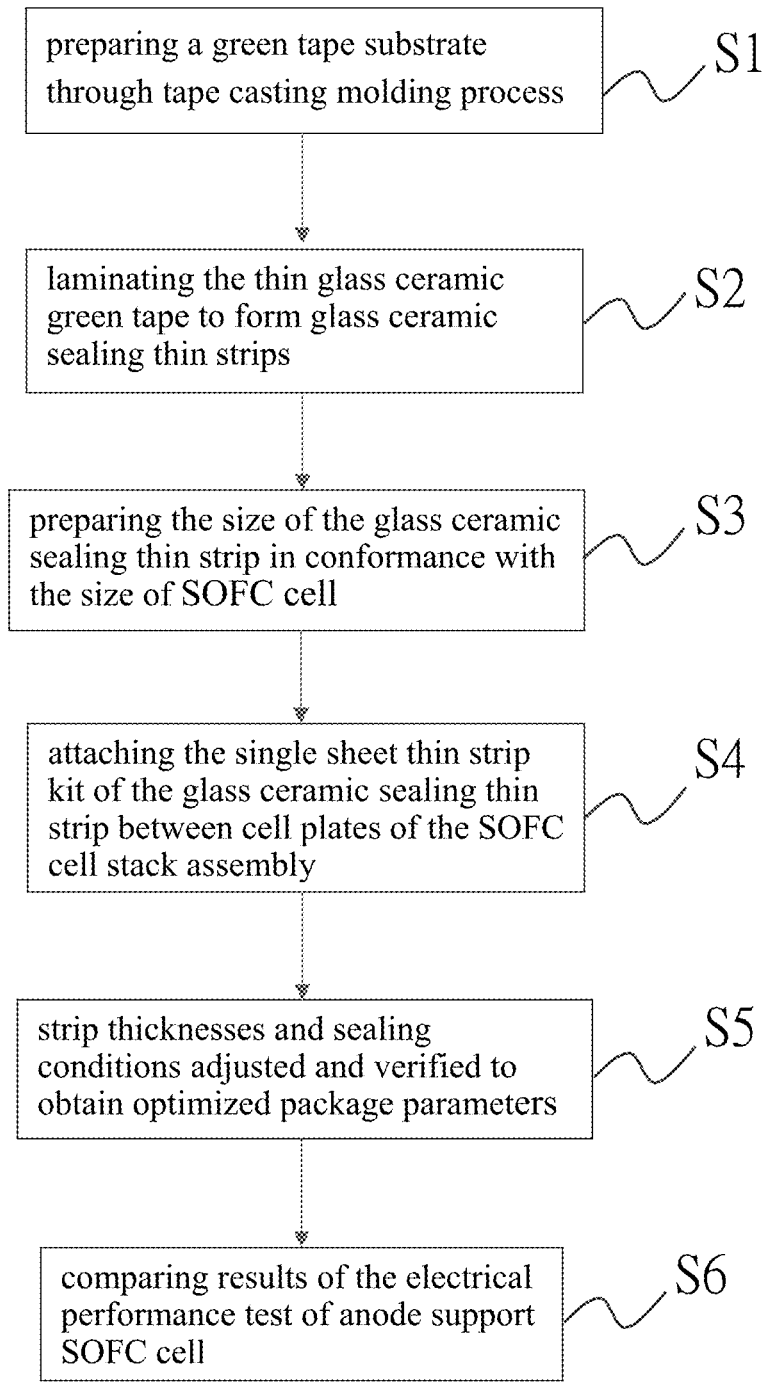
FIG. 1 is a schematic diagram of the process of the method of preparation for glass ceramic sealing thin strips of the present invention.
Figure 2:
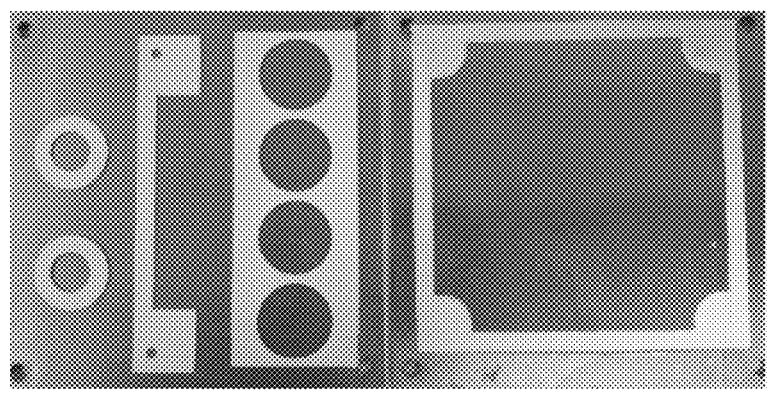
FIG. 2 is an illustration of cutting shapes of the glass ceramic sealing thin strips of the present invention in accordance to the design required for unit cells.

In a preferred embodiment, a method of preparation and application of the glass ceramic sealing thin strip for a SOFC assembly stack of the present invention. The glass ceramic material used in this preferred embodiment is a commercial glass ceramic powder, but not limited to, any glass ceramic material with high-temperature sealing characteristics is in line with the scope of the present invention. The SOFC product used may be a commercial solid oxide fuel cell. The SOFC cell used in this preferred embodiment is an anode-supported solid oxide fuel cell made by the applicant, but not limited to. The specific steps of the preparation and application of the present invention are described as follows:

FIG. 1 is a flow chart of the method of preparation for glass ceramic sealing thin strips of the present invention including steps:

selecting glass ceramic powder with sealing properties and adjusting the glass ceramic powder into a slurry and preparing a green tape substrate through tape casting molding process, of which the slurry composition includes main part of sealing glass ceramic powder, organic solvent, dispersant, pore former and binding agent, and the weight composition of the slurry ingredient used to make a thin glass ceramic green tape includes glass ceramic powder 68 wt %, methyl ethyl ketone (MEK) 17 wt %, ethyl alcohol (EtOH) 7 wt %, triethylamine (TEA) 1.5 wt %, di-n-butyl phthalate (DBP) 1.0 wt %, polyethylene glycol (PEG) 1.0 wt %, and polyvinyl butyral film (PVB) 4.5 wt %; and the thickness of a single sheet of a thin strip kit of the glass ceramic sealing thin strip is arranged between 80 and 200 µm; laminating the raw material of the glass ceramic green tape prepared by tape casting in multi-layer combination to produce a sealing thin strip with a total thickness from 300 to 800 µm through a process of thermal lamination and water pressure equalization. The number of lamination sheet is determined by the size of a single green tape and the target size, and the overall sealing thin strip is first made into sizes from 10×10 $cm^2$ to 15×15 $cm^2$ with the commercial SOFC cell; cutting a single-piece thin strip with a mold in accordance with the geometrical configuration of the cell stack for sealing the cell stack assembly, followed by attaching to between the unit cell chip and the components of the cell stack assembly, and softening sealing lamination of the cell stack at high temperature from 800 to 900° C. for 4 to 24 hour to obtain a complete sealing packaging kit of an unit cell stack assembly;

increasing the temperature and holding time to improve the high temperature softening sealing ability of the glass ceramic material, and adjusting the geometrical configuration and the thickness of the unit cell chip in accordance with the thermal analysis characteristics of the glass ceramic material used to meet the specifications and fitting parameters of the sealing strips, and the sealing strips can be punched and cut into different shapes in accordance with different configuration of the cell stack assembly, as shown in FIG. 2. In FIG. 2, the sealing strips are punched into various shapes through the molding process, including frames with square hollow portion, rings with circular hollow portion, plates with a plurality of circular hollow portions, and parts cut into various shapes in conformance with cell plates configured in the SOFC stack assembly.

The glass ceramic material in this preferred embodiment uses a commercial glass ceramic powder, and the cells used are two sets of self-made anode-supported solid oxide fuel cells. The sample A had a strip thickness of 500 μm and high temperature sealing was performed at around 880° C. for 8 hours. The sample B had a strip thickness of 700 μm and high-temperature sealing was performed at 850° C. for 24 hours.

The use of the glass ceramic sealing strip of the present invention for cell stack packaging operation can prevent thermal stress cracking due to uneven thickness of the packaging material during high temperature sealing due to the different operating time and geometry configuration of components in conventional dispensing packaging process, resulting in electrical leaks in cell stack and cell failure. The sealing conditions, the optimization of sealing conditions of thin strips, such as the thickness of cells to be assembled and sealed, and sealing temperature and time must be taken into consideration for the thin strip packaging and the verification of the electrical output test of the single cell stack of the present invention.

Figure 3:
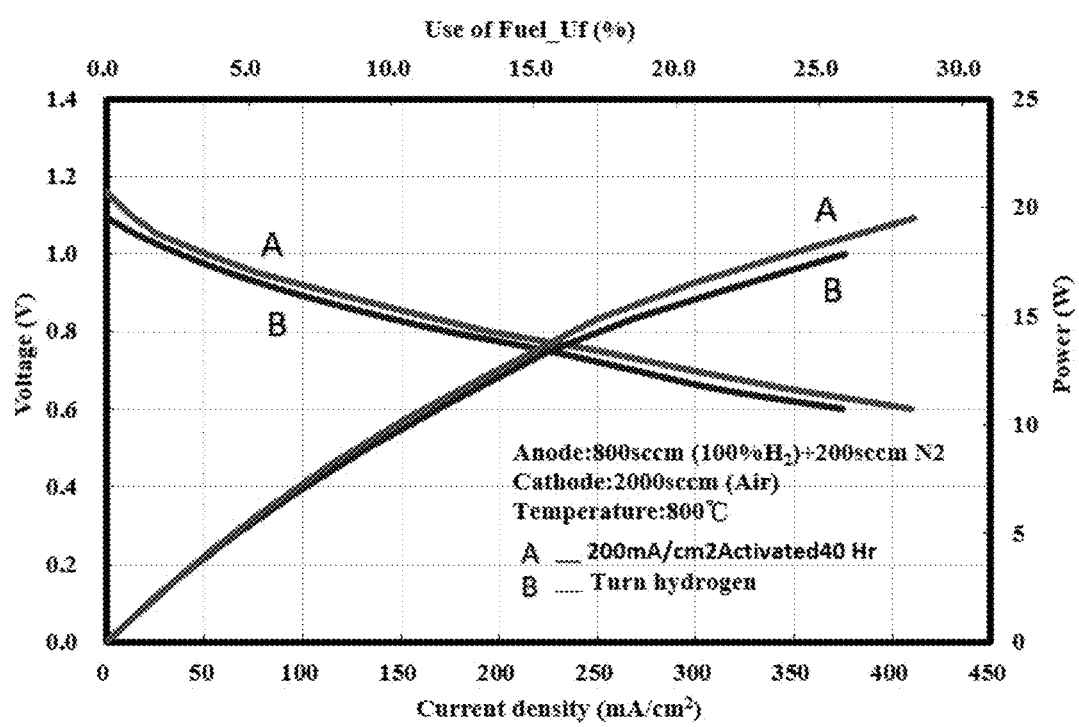
FIG. 3 is an illustration of preliminary adjustment of packaging conditions and test results of electrical performance of sample A of the present invention.
Figure 4:
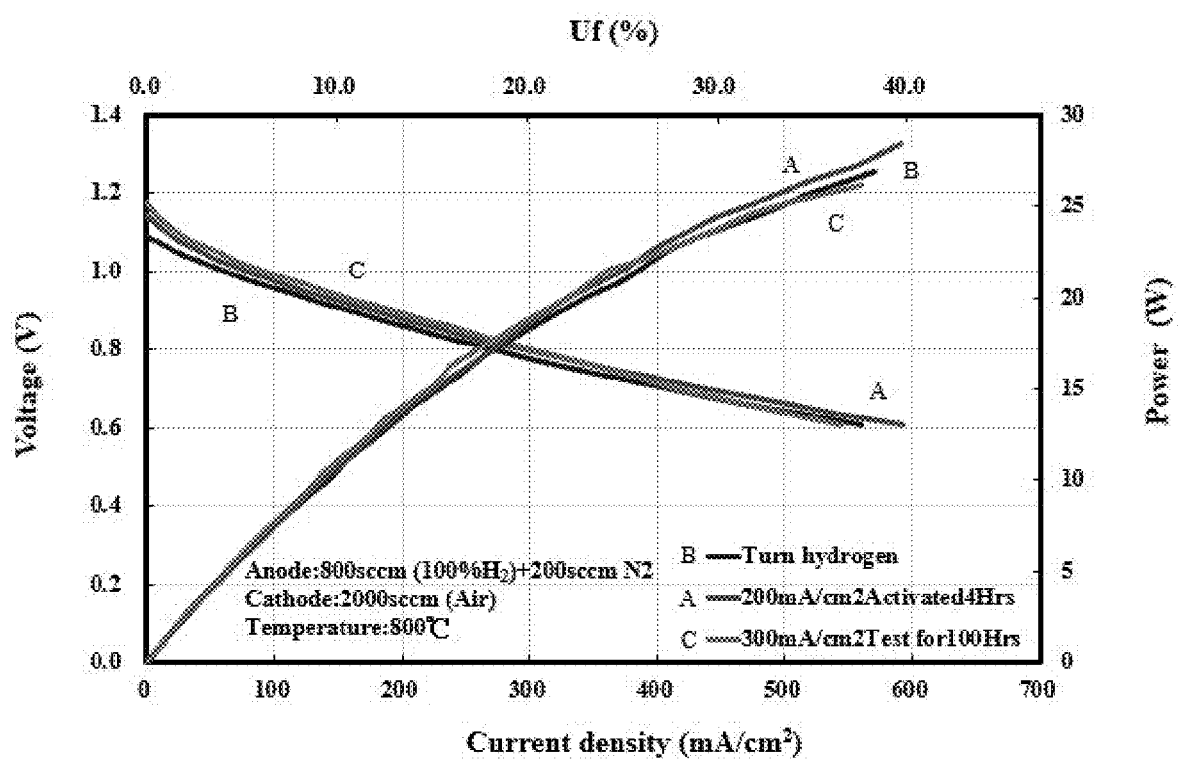
FIG. 4 is an illustration of optimized packaging conditions and test results of electrical performance of sample B of the present invention.

The comparison results of the electrical performance test are shown in FIGS. 3 and 4, in which, FIG. 3 is an illustration of preliminary adjustment of packaging conditions and test results of electrical performance of sample A of the present invention, and FIG. 4 is an illustration of optimized packaging conditions and test results of electrical performance of sample B of the present invention, which shows that the open circuit voltage of the single cell stack is close to the theoretical standard value (>1.1 V). From the results, it is shown that the anode support cell (ASC) (NiO-YSZ|YSZ|YSZ-LSM|LSM, thickness 430 μm, size>10×10 cm$^2$) made by the applicant, and the effect of different strip thicknesses and sealing conditions on specific specifications of cells has been adjusted and verified to obtain optimized package parameters for sample B. The power generation efficiency of sample B is significantly higher than that of sample A by more than 50%.

The single-cell stack packaging of solid oxide fuel cells prepared in conventional way by applying a sealant to glue coating and components. It is not easy to perform continuous and large-scale stack packaging operations and the time difference due to work sequence causes uneven thickness and size of sealing strips, resulting in defects and leakage incurred during high temperature sealing. The present invention uses a thin strip for battery stack sealing, which has mass production and controllable sealing glue size. Experiments have proved that glass ceramic thin strips have flexible substrates that can be stacked, cut, and formable. Optimized sealing conditions of the thin strips can achieve excellent sealing effect and obtain good cell stack power generation efficiency. The remaining sealed glass ceramic thin strips can be recycled to make the ceramic slurry required for tape casting with proper proportion for cost reduction.

What is claimed is:

1. A method for manufacturing a glass ceramic sealing thin strip, comprising the steps of:
    selecting a glass ceramic powder having sealing properties,
    adjusting the glass ceramic powder into a slurry and preparing a green tape substrate through tape casting molding process, wherein the slurry ingredient comprises essentially of sealing glass ceramic powder, organic solvent, dispersant, pore former and binding agent;
    laminating a thin glass ceramic green tape of the glass ceramic sealing thin strip to form the glass ceramic sealing thin strip through a process of thermal lamination and water pressure equalization;
    preparing a size of the glass ceramic sealing thin strip in conformance with the size of a SOFC cell;
    cutting the glass ceramic sealing thin strip into a single sheet thin strip kit for sealing the SOFC cell stack through a molding process in conformance with the geometry of the SOFC cell stack assembly, wherein the sealing strips are punched into various shapes through the molding process, including frames with square hollow portion, rings with circular hollow portion, plates with a plurality of circular hollow portion, and parts cut into various shapes in conformance with cell plates configured in the SOFC cell stack assembly;
    attaching the single sheet thin strip kit of the glass ceramic sealing thin strip between unit cell chips and components of the SOFC cell stack assembly, and soften the SOFC cell stack assembly at high temperature from 800° C. to 900° C. before pressing and sealing the SOFC cell stack assembly;
    determining an electrical performance test of the open-circuit voltage of a single cell of the SOFC cell stack assembly sealed by the glass ceramic sealing thin strip thus manufactured.

2. The method for manufacturing a glass ceramic sealing thin strip of claim 1, wherein the thickness of the single sheet thin strip kit of the glass ceramic sealing thin strip is between 80 and 200 μm.

3. The method for manufacturing a glass ceramic sealing thin strip of claim 1, wherein the number of stacking thin glass ceramic green tape of the glass ceramic sealing thin strip is determined by the size of the single sheet green tape and the size of the cell stack assembly.

4. The method for manufacturing a glass ceramic sealing thin strip of claim 1, wherein the overall thickness of the glass ceramic sealing thin strip is between 300 and 800 μm.

5. The method for manufacturing a glass ceramic sealing thin strip of claim 1, wherein the size of overall glass ceramic sealing thin strip is first made into a size between 10×10 cm$^2$ and 15×15 cm$^2$ with a SOFC cell.

6. The method for manufacturing a glass ceramic sealing thin strip of claim 1, wherein the glass ceramic thin strip kit is attached between the cell and the cell stack assembly, and the cell stack assembly is performed at 800° C. to 900° C. for 4 to 24 hours of softening treatment before pressing and sealing.

7. The method for manufacturing a glass ceramic sealing thin strip of claim 1, wherein a glass ceramic sealing thin strip packaging parameter test is performed using two sets of anode-supported SOFC chip sample A and B, wherein the thickness of the sample A is 500 μm and high temperature sealing was performed at 880° C. for 8 hours, and the thickness of the thin strip of the sample B is 700 μm and high temperature sealing was performed at 850° C. for 24 hours.

8. The method for manufacturing a glass ceramic sealing thin strip of claim 7, wherein the testing thickness of the anode-supported SOFC is 430 μm, the size is no less than 10×10 cm$^2$, and the composition is NiO-YSZ, YSZ, YSZ-LSM, LSM.

\* \* \* \* \*